Patented Dec. 23, 1947

2,433,098

UNITED STATES PATENT OFFICE 2,433,098

POLYVINYL ACETAL RESIN COMPOSITION

Max O. Debacher, Springfield, Mass., assignor to Monsanto Chemical Company, St. Louis, Mo., a corporation of Delaware No Drawing. Application February 25, 1944, Serial No. 523,889

18 Claims. (Cl. 260—19)

This invention relates to improved compositions of matter comprising polyvinyl acetal resins.

Polyvinyl acetal resin compositions have many advantageous characteristics as is known to those skilled in the art. However, for certain purposes, the use of such compositions has been restricted to some extent, thus making it desirable to effect improvements in certain properties.

It is an object of this invention to provide improved polyvinyl acetal resin compositions. A particular object is to provide thermosetting polyvinyl acetal resin compositions having improved characteristics.

According to the present invention, improved compositions are prepared by combining polyvinyl acetal resins, partial esters of polyhydric alcohols with unsaturated aliphatic acids and reaction products of aldehydes with substances from the class consisting of phenols and substances capable of forming aminoplasts by reaction with aldehydes. Thus, these compositions may be converted into unusually elastic, infusible, insoluble products, exhibit surprisingly low weight losses when heated in thin layers and have other unexpected and valuable characteristics as illustrated hereinafter.

According to one embodiment of this invention, the partial esters employed are partial esters of polyhydric alcohols with unsaturated aliphatic acids having more than 9 and preferably from 10–20 carbon atoms.

According to a particular embodiment of this invention, the esters employed are glyceryl monoesters of unsaturated aliphatic acids having more than 9 and preferably from 10–20 carbon atoms. Partial esters of polyhydric alcohols with olefinic unsaturated aliphatic acids are particularly preferred.

In a particularly valuable embodiment of this invention the partial ester employed is a glyceryl monoester of an olefinic unsaturated aliphatic acid containing from 17 to 19 carbon atoms. Such compositions are found to possess an exceptionally high degree of elasticity and to permit the inclusion of exceptionally large quantities of extenders, for example, inorganic fillers such as whiting while maintaining a high degree of elasticity.

Polyvinyl acetal resins may be prepared, for example, by hydrolyzing a polyvinyl ester, for example, polyvinyl acetate, and then reacting the resulting hydrolysis product with an aldehyde. These resins may contain a certain proportion of ester and hydroxyl groups in addition to the acetal groups. U. S. patent to Morrison et al. Re. 20,430, dated June 20, 1937, illustrates suitable methods for preparing such resins. The polyvinyl acetal resins may be made from various aldehydes or mixtures thereof, or even from ketones containing an active carbonyl group. Thus, formaldehyde, acetaldehyde, propionaldehyde, butyraldehyde, valeraldehyde, hexaldehyde, benzaldehyde, cyclohexanone and the like and mixtures thereof may be employed. In general, polyvinyl acetal resins made from saturated lower aliphatic aldehydes are preferred and, in particular, polyvinyl acetal resins made with saturated aliphatic aldehydes containing less than 6 carbon atoms and especially those made with butyraldehyde are preferred. When the polyvinyl acetal resins contain ester groups, the nature of the ester groups may be substantially varied, but are preferably residues of saturated lower aliphatic acids such as acetic, propionic and butyric acids. The polyvinyl esters from which the polyvinyl acetal resins are derived may vary substantially in degree of polymerization as evidenced by the viscosity of 1-molar benzene solutions which may vary, for example, from 5–75 centipoises at 20° C.

The polyvinyl acetal resins contemplated according to the invention have at least about 30% of the ester groups in the original polyvinyl ester replaced by acetal groups and do not have more than about 50% of said ester groups replaced by hydroxyl groups.

According to one embodiment of this invention, the polyvinyl acetal resins employed contain, on a weight basis, at least 5% hydroxyl groups calculated as polyvinyl alcohol, and preferably, from 5 to 25% hydroxyl groups. These resins also contain from 0 to 30% ester groups calculated as polyvinyl ester, the ester groups preferably being acetate.

According to one embodiment of this invention, when the acetal groups are butyraldehyde acetal, the resins employed may be considered to be made up, on a weight basis, of 12–22% hydroxyl groups calculated as polyvinyl alcohol and from 15–30% acetate groups calculated as polyvinyl acetate and the balance substantially acetal. According to another embodiment, when the acetal groups are butyraldehyde acetal, the resins employed may be considered to be made up, on a weight basis, of 16-20% hydroxyl groups calculated as polyvinyl alcohol, less than 3% acetate groups calculated as polyvinyl acetate and the balance substantially butyraldehyde acetal. According to another embodiment, when the acetal groups are butyraldehyde acetal, the resins employed may be considered to be made up, on a weight basis, of 5-13% hydroxyl groups calculated as polyvinyl alcohol, less than 3% acetate groups calculated as polyvinyl acetate and the balance substantially butyraldehyde acetal.

According to one embodiment of this invention, when the acetal groups are acetaldehyde acetal, the polyvinyl acetal resin employed may be considered to be made up, on a weight basis, of 5-15% hydroxyl groups calculated as polyvinyl alcohol, 15-20% acetate groups calculated as polyvinyl acetate and the balance substantially acetaldehyde acetal.

According to one embodiment of this invention, when the acetal is formaldehyde acetal, the polyvinyl acetal resin may be considered to be made up, on a weight basis, of 5-10% hydroxyl groups calculated as polyvinyl alcohol, 10-15% acetate groups calculated as polyvinyl acetate and the balance substantially formaldehyde acetal.

An example of a mixed acetal resin is one containing, on a weight basis, 13% hydroxyl groups calculated as polyvinyl alcohol, 2 to 6% acetate groups calculated as polyvinyl acetate and the balance 65-50 mol per cent acetaldehyde acetal and 35-50 mol per cent butyraldehyde acetal.

The partial esters employed according to this invention are polyhydric alcohol partial esters, the polyhydric alcohol residues thereof containing at least one free hydroxyl group, made with unsaturated aliphatic acids. As examples of polyhydric alcohols from which these esters may be made are glycerin, mannitol, sorbitol, glucose, erythritol, pentaerythritol, glycols such as ethylene glycol, diethylene glycol, triethylene glycol and the like. Examples of unsaturated aliphatic acids which may be employed in preparing the partial esters are mono-olefinic unsaturated aliphatic acids such as propenoic acid, 2-butenoic acid, 2-methyl-2-propenoic acid, 3-butenoic acid, 2-pentenoic acid, 4-pentenoic acid, 2-methyl-2-butenoic acid, 2-hexenoic acid, 7-hexadecenoic acid, 10-undecenoic acid, 13-docosenoic acid, 3-hexenoic acid, and 9-octadecenoic acid; diolefinic unsaturated aliphatic acids such as 2,4-pentadienoic acid, 2,4-hexadienoic acid, 3,7-dimethyl-2,6 - octadienoic acid, 9,12 - octadecadienoic acid; triolefinic unsaturated aliphatic acids such as 3,7-dimethyl-2,4,6-octatrienoic acid, 9,12,15-octadecatrienoic acid, 9,11,13 - octadecatrienoic acid; substituted olefinic acids, for example, such hydroxy olefinic acids as 2-hydroxy-3-butenoic acid, 16-hydroxy-7-hexadecenoic acid and 12-hydroxy-9-octadecenoic acid; halogenated unsaturated acids, for example, 2-chloro-2-propenoic acid and 3-chloro-2-propenoic acid; monochloro-9-octadecenoic acid, monochloro-12-hydroxy-9-octadecenoic acid and halogenated acids derived by dehydration of castor oil acids followed by chlorination; acetylenic unsaturated aliphatic acids such as propynoic, butynoic, pentynoic, amyl propynoic, 7-hexadecynoic, 9-octadecynoic and 13-docosynoic acids.

Mixtures of polyhydric alcohol partial esters of unsaturated aliphatic acids may be employed and when desired, mixtures of these unsaturated esters with polyhydric alcohol partial esters of saturated aliphatic acids, as for example, esters derived from mixtures of acids occurring in various oils, as for example, linseed, castor, tung, soya bean, perilla, corn, cotton seed, sunflower, safflower, sesame, poppy seed, walnut, peanut, olive, rape seed, whale and dehydrated castor oils. The acids derived from these oils consist predominantly of unsaturated acids containing 18 carbon atoms. For certain purposes, partial esters may be used which are made of the mixture of acids occurring in oils such as palm kernel oil, cocoanut oil and the like, which mixtures of acids contain substantial amounts of unsaturated acids such as those mentioned above, but do not predominate therein.

Mixed esters may be employed in which at least one of the acid residues is unsaturated, for example, glyceryl diesters, for example, glyceryl diesters in which one acid residue is derived from 9-octadecenoic acid, and one from octadecanoic acid.

According to a particular embodiment of this invention, the esters employed are glyceryl monoesters of the unsaturated acids present in the oils mentioned above, for example, glyceryl-mono-12 - hydroxy-9-octadecenoate, glyceryl - mono-9,12 - octadecadienoate, glyceryl-mono - 9,12,15-octadecatrienoate, glyceryl-mono - 9 - octadecenoate and the like.

Various reaction products of aldehydes with phenols or substances capable of forming aminoplasts with aldehydes may be employed and the extent of reaction prior to incorporation with the other components of the compositions of this invention may be substantially varied. As examples of phenols may be mentioned phenol; hydrocarbon-substituted phenols such as para-tertiary amyl, butyl, phenyl phenol, ortho and para cresol, 1,3,5-xylenol; polyhydric phenols, such as resorcinol, hydroquinone, catechol, pyrogallol. The phenols employed should have at least one unsubstituted reactive position.

As examples of substances capable of forming aminoplasts are amino, imino, amido and imido compounds containing at least two aldehyde-replaceable hydrogen atoms attached to nitrogen atoms. Examples of these compounds are aminotriazines such as melamine, substituted melamines, for example, chlorinated, alkylated or phenylated melamines, deaminated melamines, for example, ammeline, ammelide and the like; 2,4,6-triethyl and triphenyl-triamino-1,3,5-triazines, 2,4,6-trihydrazino-1,3,5-triazine; the corresponding condensed triazines such as melam and melem, 2-amino-1,3,5-triazine, 2-chloro-4,6-diamino-1,3,5-triazine, 2-phenyl-4-amino-6-hydroxyl-1,3,5-triazine and 6-methyl-2,4-diamino-1,3,5-triazine. Other compounds capable of forming aminoplasts with aldehydes are ureas, such as urea, thiourea, diurea, hydroxyurea, diethylene thiourea, ethanol urea, unsymmetrical diphenyl urea, methyl urea, acetyl urea, phenyl thiourea, allyl urea, methylol ureas, methylene ureas, guanidine, dicyandiamide, guanyl urea; creatinine; guanoline; proteins such as casein; aromatic amines such as aniline; sulfonamides such as benzene disulfonamide, toluene sulfonamide; sulfanilamide; poly amides, such as malonic diamide, maleic diamide, fumaric diamide, itaconic diamide.

Mixtures of the foregoing aldehyde reaction products may be employed according to this invention.

As pointed out above, the extent of reaction between the aldehydes and phenols or substances capable of forming aminoplasts prior to incorporation with the other components of the products of this invention, may be substantially varied. Thus, the reaction products employed may be monomeric reaction products, e. g. phenol alcohols such as mono-, di-, or tri-methylol phenol; di-, tri-, tetra-, penta- or hexamethylol melamine; dimethylol urea or the like. Generally, however, the reaction is carried beyond the monomeric stage to form resinous reaction products. When the aldehydes are reacted with substances capable of forming thermostat resins, the reaction is generally stopped while the resin is still in the soluble state. Generally the aldehyde reaction products are substantially freed from water, for example, by vacuum distillation or other means prior to incorporation with the other ingredients of the compositions of this invention.

As examples of phenol-aldehyde resins employable according to this invention are the phenol-formaldehyde resins set forth hereinafter in the specific examples. Other phenolic resins may be employed, for example, oil-soluble resins prepared from hydrocarbon substituted phenols such as para propyl phenol, para-tertiary amyl phenol, para-tertiary butyl phenol or para-phenyl phenol and fomaldehyde may be employed. Compositions that are more rapidly converted to the infusible, insoluble state are obtained when the phenol employed is unsubstituted in the ortho and para positions, for example, phenol, resorcinol, meta-cresol and 1,3,5-xylenol. Other phenols that may be employed include o-cresol, p-cresol, and p-aralkyl phenols such as the phenols prepared by reacting phenol with styrene. Examples of the oil-soluble hydrocarbon-substituted phenol-aldehyde resins are disclosed by the Honel Patents 1,996,069, 1,996,070 and 2,079,210 and the German Patent 340,989. Other aldehydes may be employed in place of formaldehyde, for example, acetaldehyde, propionaldehyde, benzaldehyde, crotonaldehyde, acrolein or mixtures thereof. Generally, substantially equal proportions of the phenol and the aldehyde are employed, although when desired up to 3 molecular proportions of the aldehyde may be employed for each molecular proportion of the phenol. The use of phenol aldehyde resins prepared under alkaline conditions promotes conversion to the infusible, insoluble state, particularly when the molecular ratio of formaldehyde to phenol does not substantially exceed 1:1. Thus, the phenol and the aldehyde may be reacted in the presence of sodium hydroxide, ammonia, barium hydroxide or quaternary ammonium hydroxides such as dimethyl dibenzyl ammonium hydroxide or tetraethanol ammonium hydroxide. When acid condensing agents are needed, such materials as sulfuric acid, hydrochloric acid, oxalic acid, or mono-sodium phosphate may be employed.

While formaldehyde (or compounds engendering formaldehyde), particularly aqueous solutions of formaldehyde, is the preferred aldehyde employed for reaction with phenols or substances forming aminoplasts by reaction with aldehydes, other aldehydes may be used. As examples may be mentioned aliphatic aldehydes such as acetaldehyde, propionaldehyde, butyraldehyde, heptaldehyde, hexaldehyde and furfural; unsaturated aldehydes such as acrolein, methacrolein and crotonaldehyde; aromatic aldehydes such as benzaldehyde; and mixtures of the foregoing aldehydes.

The polyvinyl acetal resins, unsaturated esters and aldehyde reaction products may be combined in any desired manner. For example solutions of the three ingredients in suitable solvents may be combined or the ingredients may be simultaneously heat-softened and intermixed on milling rolls or in a Banbury or Werner-Pfleiderer mixer. Preferably, the unsaturated esters are combined with the polyvinyl acetal resins prior to incorporation of the aldehyde reaction products.

The proportion of aldehyde reaction product employed may be substantially varied, for example, from about 2 to 50% based on the amount of polyvinyl acetal resin and preferably from about 4 to 30%.

In general, at least about 25 and preferably, from about 45 to 150 parts of the partial esters are employed for every 100 parts of polyvinyl acetal resin. When mixtures with other plasticizers are employed, at least about 25% of the plasticizer content usually consists of the partial esters of this invention and preferably at least about 50%.

The following examples illustrate the improved compositions of the present invention, but are not limitative thereof. Where parts are specified, the parts are by weight.

The polyvinyl butyraldehyde acetal resin employed in the examples is prepared from a polyvinyl acetate of such a degree of polymerization that a 1-molar benzene solution possesses a viscosity of substantially 50–55 centipoises at 20° C. The polyvinyl butyraldehyde acetal resin may be considered to be made up, on a weight basis, of 16–20% hydroxyl groups calculated as polyvinyl alcohol, less than 3% acetate groups calculated as polyvinyl acetate and the balance substantially butyraldehyde acetal.

The phenolic resin employed in the examples in Table I is an oil-soluble resin prepared by reacting para tertiary butyl phenol and formaldehyde under alkaline conditions.

The tensile strength and elongation values given in the examples are obtained by means of a Scott Tilting Table Type Testing Machine (IP4) with an initial jaw separation of 0.5 inch and a constant rate of increase of load using a 50-pound weight and a speed of 200 R. P. M. The sample employed is a 0.020 inch thick sheet which is 0.5 inch in width and previously conditioned for 48 hours at 25° C. and at a relative humidity of 50%. Prior to conditioning, the sheets are cured by heating at about 130° C. for one hour. These sheets may be prepared by pressing the products into the form of a block and then skiving sheets therefrom of the desired thickness.

The several ingredients employed in the examples in Table I may be mixed, for example, in the following manner: The polyvinyl acetal resin and the plasticizers are mixed in a Banbury mixer to form a homogeneous composition. The resulting composition is placed on constant speed milling rolls heated to a temperature of 105 to 120° C. and thereafter the phenolic resin and the zinc oxide are added. When desired, the phenolic resin and the zinc oxide may be incorporated with the plasticized polyvinyl acetal resin in the Banbury mixer. Finally, filling material, coloring matter, lubricants, and/or other materials are introduced, either in a mixer or on rolls. The proportions of ingredients given in the examples of Table I are based on 100 parts of polyvinyl butyraldehyde acetal resin.

Table I

| Example No. | Plasticizer | Phenolic Resin | Zinc Oxide | Whiting | Tensile Strength | Per cent Ultimate Elongation |
|---|---|---|---|---|---|---|
| 1 | Glyceryl monoester of linseed oil acids............67 | 10 | 20 | ......... | 1,940 | 340 |
| 2 | Glyceryl monoester of linseed oil acids............90 | 10 | 20 | ......... | 1,250 | 360 |
| 3 | Glyceryl monoester of linseed oil acids............30<br>Butyl-12-hydroxy-9-octadecenoate.................60 | 10 | 20 | ......... | 1,120 | 400 |
| 4 | Glyceryl mono-9-octadecenoate....................30<br>Butyl-12-hydroxy 9-octadecenoate..................60 | 10 | 20 | ......... | 1,030 | 410 |
| 5 | Glyceryl monoester of dehydrated castor oil acids..45<br>Butyl 12-hydroxy 9-octadecenoate..................45 | 10 | 20 | ......... | 1,580 | 360 |
| 6 | Glyceryl mono-12-hydroxy-9-octadecenoate.......45<br>Butyl-12-hydroxy-9-octadecenoate.................45 | 10 | 20 | ......... | 1,490 | 370 |
| 7 | Glyceryl mono-9-octadecenoate....................120 | 10 | 20 | 100 | 1,230 | 340 |
| 8 | ...do........................................... 120 | 25 | 25 | 130 | 810 | 360 |
| 9 | Glyceryl mono-9-octadecenoate....................90 | 10 | 20 | 100 | 1,500 | 300 |
| 10 | Glyceryl mono-9-octadecenoate....................45<br>Butyl 12-hydroxy-9-octadecenoate.................45 | 5 | 20 | 100 | 1,330 | 320 |
| 11 | Glyceryl monoester of linseed oil acids............45<br>Butyl 12-hydroxy-9-octadecenoate.................45 | 10 | 20 | ......... | 1,250 | 380 |
| 12 | Glyceryl monoester of dehydrated castor oil acids..60 | 5 | 20 | ......... | 2,950 | 310 |

The examples given in Table II below illustrate further embodiments of the present invention. The phenolic resin employed in these examples is made by reacting phenol with formaldehyde under alkaline conditions. The method of mixing the ingredients and the test methods are the same as those employed in the examples given in Table I. The per cent plasticizer loss based on the original plasticizer content, is determined by subjecting 0.020 inch thick sheets to a temperature of about 130° C. for 2 hours with one surface exposed. The exudation is determined by curing 0.020 inch thick sheets for one hour at about 130° C. and then subjecting the sheets, spread out on polished metal plates, to a relative humidity of 81% at 25° C. for 7 days. Any exudation of plasticizer is readily ascertained by an inspection of the polished metal sheets. All the compositions of the examples given in Table II are made by admixing 100 parts of polyvinyl butyraldehyde acetal resin with 80 parts of the plasticizer specified, 5 parts of phenolic resin, 25 parts of zinc oxide and 1 part of lubricant such as stearic acid.

Table II

| Example No. | Plasticizer | Per Cent Plasticizer Loss | Tensile Strength | Per Cent Ultimate Elongation |
|---|---|---|---|---|
| 13 | Glyceryl mono-9-octadecenoate........................ | 6.9 | 2,020 | 350 |
| 14 | Glyceryl monoester of dehydrated castor oil acids.. | 6.3 | 1,830 | 380 |
| 15 | Glyceryl mono-12-hydroxy-9-octadecenoate......... | 4.2 | 2,000 | 360 |
| 16 | Glyceryl monoester of corn oil acids................... | 13.7 | 2,130 | 325 |
| 17 | Glyceryl monoester of soya bean oil acids.......... | 5.5 | 1,850 | 320 |
| 18 | Glyceryl monoester of cocoanut oil acids........... | 13.2 | 1,650 | 350 |
| 19 | Glyceryl monoester of China-wood oil acids........ | 5.0 | 2,640 | 285 |
| 20 | Glyceryl monoester of cottonseed oil acids......... | 7.7 | 2,050 | 290 |
| 21 | Glyceryl monoester of palm oil acids................ | 8.2 | 2,550 | 290 |
| 22 | Glyceryl monoester of perilla oil acids.............. | 6.6 | 1,860 | 340 |
| 23 | Glyceryl monoester of linseed oil acids.............. | 5.3 | 1,550 | 330 |
| 24 | Glyceryl monoester of sunflower oil acids.......... | ......... | 1,550 | 300 |

None of the products of the examples in Table II show evidence of exudation when tested as described above. In contrast to these results, a similar product containing as a plasticizer butyl 12-hydroxy-9-octadecenoate exudes badly as a result of being subjected to the test conditions. In further contrast to the products of the examples in Table II, a similar composition containing dibutyl phthalate as the plasticizer shows a plasticizer loss of 69% when subjected to the heat treatment described above.

As further evidence of the advantageous characteristics of the products of this invention, it is noted that the product described in Example 6 shows no exudation when tested as described in connection with the examples in Table II, after 15 minutes curing at 130° C., whereas the product described in Example 4, containing a smaller proportion of the partial ester, requires more than thirty minutes curing at 130° C. to pass the exudation test.

As evidence of the curing characteristics of the products of this invention, it is noted that while the product described in Example 3 is initially soluble in ethanol, after 30 minutes curing of a 0.020 inch thick sheet at 130° C., the action of ethanol on a strip of the product ½ inch wide only causes an increase in dimensions of 110% after 48 hours immersion at room temperature. On further heating for an additional 30 minutes, the swelling is reduced to 63% and after a total curing time of 2 hours, the increase in dimensions is reduced to 50% on immersion in ethanol for 48 hours at room temperature.

*Example 25*

|   | Parts |
|---|---|
| Polyvinyl butyraldehyde acetal resin | 100 |
| Glyceryl monoester of dehydrated castor oil acids | 45 |
| Glyceryl monostearate | 45 |
| Phenolic resin[1] | 5 |
| Zinc oxide | 25 |
| Filler (whiting) | 100 |

[1] Same resin as employed in examples in Table II.

The above ingredients are compounded in the manner set forth hereinbefore to form a homogeneous composition exhibiting substantially greater flexibility than a similar composition employing 90 parts of glyceryl monostearate as the plasticizer after curing for one hour at 130° C. An outstanding characteristic of sheets made from this composition is their resistance to the passage of gases such as mustard gas. Substitution of mica, for example, 300–350 mesh mica, for the whiting serves to further increase the gas resistance.

The following example illustrates the surprisingly large amounts of the plasticizers of this invention that may be employed to produce homogeneous compositions. This example also illustrated the surprisingly large amounts of fillers that may be included in the compositions of this invention.

*Example 26*

|  | Parts |
|---|---|
| Polyvinyl butyraldehyde acetal resin | 100 |
| Glyceryl mono-9-octadecenoate | 120 |
| Zinc oxide | 25 |
| Phenolic resin[1] | 25 |
| Whiting | 130 |

[1] The same resin as employed in the examples in Table I.

The foregoing ingredients may be compounded in the usual manner to give a product after curing for two hours at 135° C. that possesses a tensile strength of 810 pounds per square inch and an elongation of 360%. Both before and after curing, the product is exceedingly elastic and resembles rubber in this respect to a far greater degree than polyvinyl acetal resins plasticized with the usual plasticizers, for example, dibutyl phthalate, dibutyl sebacate, and the like.

The following example illustrates the use of a diester of glycerin.

*Example 27*

|  | Parts |
|---|---|
| Polyvinyl butyraldehyde acetal resin | 100 |
| Glyceryl diester of linseed oil acids | 45 |
| Butyl 12-hydroxy-9-octadecenoate | 45 |
| Phenolic resin[1] | 10 |
| Zinc oxide | 20 |

[1] The same resin as employed in the examples in Table I.

The foregoing ingredients may be compounded in the usual manner to produce a homogeneous, extremely flexible product that cures to an insoluble, infusible state on heating.

*Example 28*

|  | Parts |
|---|---|
| Polyvinyl butyraldehyde acetal resin | 100 |
| Butyl-12-hydroxy-9-octadecenoate | 60 |
| Glyceryl mono-9-octadecenoate | 30 |
| Zinc oxide | 20 |
| Phenolic resin[1] | 10 |
| Stearic acid | 1 |
| Crown Clay[2] | 100 |

Other clays may be employed.

[1] The same resin as employed in the examples in Table II.
[2] A clay marketed by Southeastern Clay Co.

The foregoing ingredients, after compounding in the usual manner, cures on 15 minutes heating at 130° C. to a product that swells only 50% on immersion in ethanol at room temperature for 48 hours. A similar product in which whiting replaces the Crown Clay requires two hours to cure to the same point.

When desired, the zinc oxide may be omitted from the compositions described in the examples in preparing infusible, insoluble compositions, but the curing time is thereby increased. Other metal oxides may be employed in place of zinc oxide, for example, magnesium oxide (MgO), tin oxide (SnO) and the like.

An extremely advantageous characteristic of the compositions of this invention is the extremely high proportion of plasticizer that may be employed without rendering the resulting compositions unduly tacky or subject to exudation on standing. Another particularly advantageous characteristic of the compositions according to this invention is their high flexibility at low temperatures. Thus, a composition compounded from the following ingredients shows flexibility at −60° C. after curing at 130° C. for 60 minutes when tested on the Bell Telephone Laboratories Brittleness Tester described in Industrial and Engineering Chemistry, vol. 35, page 488 (1943).

|  | Parts |
|---|---|
| Polyvinyl butyraldehyde acetal resin | 100 |
| Glyceryl mono-9-octadecenoate | 30 |
| Butyl 12-hydroxy-9-octadecenoate | 60 |
| Phenolic resin[1] | 5 |
| Zinc oxide | 25 |
| Stearic acid | 2 |

[1] Same resin as employed in the examples in Table II.

The compositions of this invention may be formed into sheets or other articles or may be used for coating such materials as cloth, paper, wood, metal, concrete or other base material. Cloth, for example, may be advantageously coated and/or impregnated by calendering or by applying a solution of the composition and then evaporating the solution. When advantageous, fillers may be included, as for example, carbon black, whiting and the like.

When applying the compositions of this invention to materials such as those given above at raised temperatures, care is taken to avoid converting the compositions to the infusible, insoluble state, thus, temperatures below about 100° C. are generally used. Thereafter, the compositions may be cured by raising the temperature, for example, from 130 to 140° C. as indicated hereinbefore, to form insoluble, infusible, tough, elastic coatings.

What is claimed is:

1. A composition comprising 100 parts of a polyvinyl acetal resin containing, on a chemical equivalent basis, at least 30% acetal groups and not more than 50% hydroxyl groups, 25–150 parts of a partial ester of glycerin and an aliphatic monobasic carboxylic acid containing carbon to carbon unsaturation, and 2–50 parts of an aldehyde reaction product from the group consisting of monomeric phenol alcohols which are formed by reaction of phenols and aldehydes, resinous phenol-aldehyde reaction products and reaction products of aldehydes with substances containing two aldehyde-reactive hydrogen atoms attached to nitrogen and capable of forming resinous materials by reaction with aldehydes, said aldehyde reaction product being incorporated while in the soluble state.

2. A composition comprising 100 parts of a polyvinyl acetal resin containing, on a weight basis, 5–25% hydroxyl groups calculated as polyvinyl alcohol, up to 30% acetate groups calculated as polyvinyl acetate and the balance substantially acetal, 25–150 parts of a monoester of glycerin and an aliphatic monobasic carboxylic acid containing carbon to carbon unsaturation and having more than 9 but less than 21 carbon atoms, and 2–50 parts of an aldehyde reaction product from the group consisting of monomeric phenol alcohols which are formed by reaction of phenols and aldehydes, resinous phenol-aldehyde reaction products and reaction products of aldehydes with substances containing two aldehyde-reactive hydrogen atoms attached to nitrogen and capable of forming resinous materials by reaction with aldehydes, said aldehyde reaction product being incorporated while in the soluble state.

3. A composition comprising 100 parts of a polyvinyl acetal resin containing, on a weight basis, 5-25% hydroxyl groups calculated as polyvinyl alcohol, up to 30% acetate groups calculated as polyvinyl acetate and the balance substantially butyraldehyde acetal, 25-150 parts of a monoester of glycerin and an aliphatic monobasic carboxylic acid containing carbon to carbon unsaturation and having more than 16 but less than 20 carbon atoms, and 2-50 parts of an aldehyde reaction product from the group consisting of monomeric phenol alcohols which are formed by reaction of phenols and aldehydes, resinous phenol-aldehyde reaction products and reaction products of aldehydes with substances containing two aldehyde-reactive hydrogen atoms attached to nitrogen and capable of forming resinous materials by reaction with aldehydes, said aldehyde reaction product being incorporated while in the soluble state.

4. A composition as defined in claim 3 in which the monoester of glycerin is glyceryl mono-12-hydroxy-9-octadecenoate and the aldehyde reaction product is a resinous phenol formaldehyde reaction product.

5. A composition as defined in claim 1 in which the unsaturated aliphatic acid contains more than 9 but less than 21 carbon atoms.

6. A composition as defined in claim 1 in which the polyvinyl acetal resin is a polyvinyl butyraldehyde-acetal resin.

7. A composition as defined in claim 1 in which the polyvinyl acetal resin is a polyvinyl butyraldehyde-acetal resin and the partial ester is a partial ester of an unsaturated aliphatic acid containing more than 9 but less than 21 carbon atoms.

8. A composition as defined in claim 2 in which the polyvinyl acetal resin is a polyvinyl butyraldehyde-acetal resin.

9. A composition as defined in claim 1 in which the aldehyde reaction product is a resinous phenol aldehyde reaction product.

10. A composition as defined in claim 2 in which the polyvinyl acetal resin is a polyvinyl butyraldehyde-acetal resin and the aldehyde reaction product is a resinous phenol aldehyde reaction product.

11. A composition as defined in claim 1 in which the aldehyde reaction product is a resinous phenol-formaldehyde reaction product.

12. A composition as defined in claim 3 in which the aldehyde reaction product is a resinous phenol-formaldehyde reaction product.

13. A composition as defined in claim 3 in which the glyceryl ester is glyceryl mono-9-octadecenoate.

14. A composition as defined in claim 3 in which the glyceryl ester is a glyceryl mono-9-octadecenoate and the aldehyde reaction product is a resinous phenol-formaldehyde reaction product.

15. A composition as defined in claim 3 in which the glyceryl ester is glyceryl mono-12-hydroxy-9-octadecenoate and the aldehyde reaction product is a resinous phenol-formaldehyde reaction product.

16. An infusible, insoluble product resulting from subjecting the composition defined in claim 1 to the action of heat.

17. An infusible, insoluble product resulting from subjecting the composition as defined in claim 1, in which the aldehyde reaction product is a resinous phenol-formaldehyde reaction product, to the action of heat.

18. An infusible, insoluble product resulting from subjecting to the action of heat the composition defined in claim 3 in which the glyceryl ester is glyceryl mono-9-octadecenoate and the aldehyde reaction product is a resinous phenol-formaldehyde reaction product.

MAX O. DEBACHER.

REFERENCES CITED

The following references are of record in the file of this patent:

UNITED STATES PATENTS

| Number | Name | Date |
|---|---|---|
| 2,079,108 | Dreyfus | May 4, 1937 |
| 2,160,532 | Barrett et al. | May 30, 1939 |
| 2,222,490 | Robertson | Nov. 19, 1940 |
| 2,302,557 | Langkammerer | Nov. 17, 1942 |
| 2,307,588 | Jackson et al. | Jan. 5, 1943 |
| 2,396,098 | Haas | Mar. 5, 1946 |

FOREIGN PATENTS

| Number | Country | Date |
|---|---|---|
| 413,718 | Great Britain | July 20, 1934 |
| 534,671 | Germany | Sept. 30, 1931 |

OTHER REFERENCES

Vinylite Thermosetting Vinyl Butyrla Spreader Coating Resins, 5 pp. booklet published 1943 by Carbide and Carbon Chem. Co., N. Y.

The Resinous Reporter, pp. 2 and 3, May 1943, vol. IV, No. 2, pub. by Resinous Products and Chem. Co., Phila.

Chem. and Eng. News, Advertisement on p. 1659, vol. 21, #19, October 10, 1943.